Dec. 18, 1956   J. L. CHAPMAN, JR., ET AL   2,774,195
DOWNFEED FOR MACHINE TOOLS
Filed Aug. 18, 1954   3 Sheets-Sheet 1
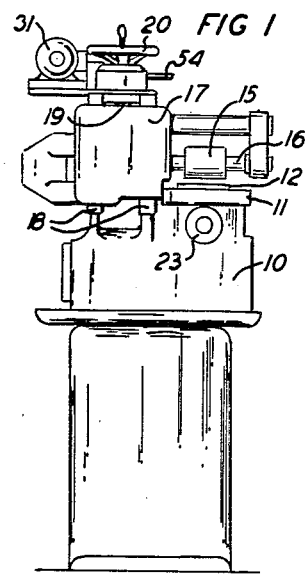
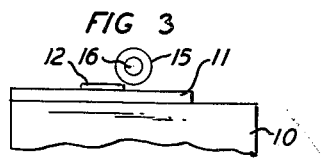
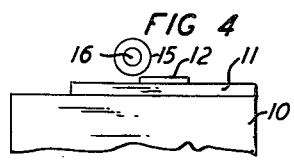
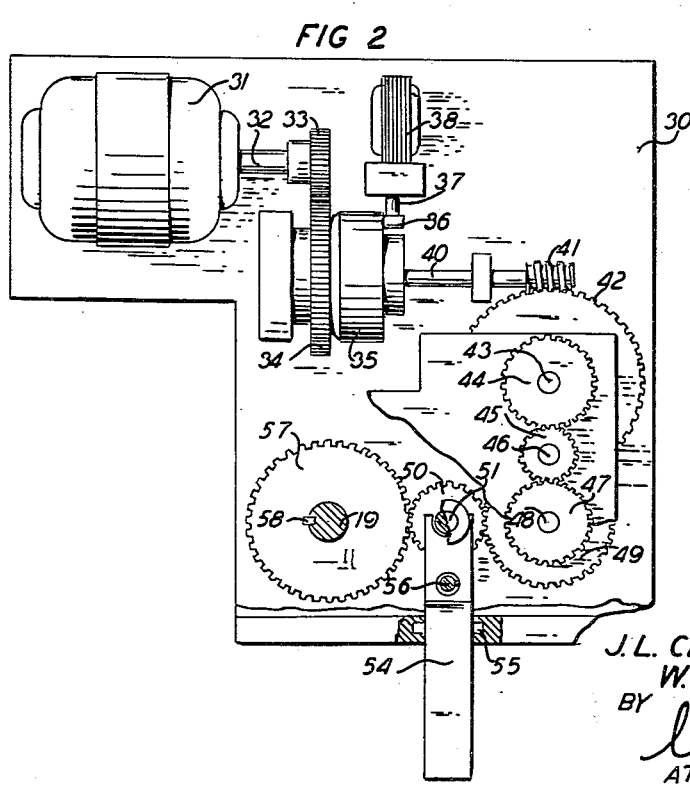
INVENTORS
J. L. CHAPMAN JR.
W. R. YEICH
BY
*W. C. Parnell*
ATTORNEY Dec. 18, 1956 J. L. CHAPMAN, JR., ET AL 2,774,195
DOWNFEED FOR MACHINE TOOLS
Filed Aug. 18, 1954 3 Sheets-Sheet 2

INVENTORS
J. L. CHAPMAN JR.
W. R. YEICH
BY
ATTORNEY

Dec. 18, 1956

J. L. CHAPMAN, JR., ET AL 2,774,195

DOWNFEED FOR MACHINE TOOLS

Filed Aug. 18, 1954

INVENTORS
J. L. CHAPMAN JR.
W. R. YEICH
BY
W.C.Parnell
ATTORNEY

United States Patent Office 2,774,195
Patented Dec. 18, 1956

2,774,195
DOWNFEED FOR MACHINE TOOLS

John L. Chapman, Jr., Catonsville, Md., and William R. Yeich, West Lawn, Pa., assignors to Western Electric Company, Incorporated, New York, N. Y., a corporation of New York Application August 18, 1954, Serial No. 450,704

3 Claims. (Cl. 51—92)

This invention relates to feeding mechanisms for material working machines and particularly to downfeed mechanisms for machine tools of the surface grinder type.

In the manufacture of transistors for the communication arts, thin slices of germanium or silicon are subdivided or diced to form small wafers. Since these materials are both very hard and very brittle, the dicing operation presents a special problem. It can be carried out by the usual climb-cutting with an extremely slow feed of the slice to gauged saws. Due to the very slow feed, this is inherently a high cost operation and with this method, the feed rate cannot be greatly increased because in that event too much material is lost by fracturing or spoiled by thermal shock due to the excessive heat developed at the cut.

The object of this invention is to reduce the unit cost of producing these hard brittle wafers.

According to the invention, the cutting rate is greatly increased and the unit cost correspondingly reduced by a combination plunge cutting and surface grinding machine in which the work is reciprocated with respect to the cutting wheels at an optimum rate and the wheels are automatically advanced toward the work at the end of each pass a small distance representing the maximum safe plunge cut. In one machine of this type which has been found particularly well adapted for use in cutting germanium and silicon a downfeed mechanism, for a spindle manually actuable to feed a driven cutting wheel downwardly toward a path of work on a reciprocable support, includes automatic means to bring about a known adjustment of the mechanism at the end of each stroke of the work support. One of the important features includes a one-revolution clutch to connect a continuously driven motor to a train of gears operatively connected to the spindle of the adjusting wheel of the surface grinder. The clutch is under the control of a solenoid energized at the completion of each half cycle of the machine or at the end of each stroke of the work support to bring about a known adjustment of the downfeed mechanism.

Other objects and advantages will be apparent from the following detailed description when considered in conjunction with the accompanying drawings, wherein:

Fig. 1 is a front elevational view of the surface grinder embodying the invention;

Fig. 2 is a top plan view of the downfeed mechanism for the surface grinder;

Fig. 3 is a fragmentary schematic illustration of the work support with work relative to the cutting wheel at one end of the feeding stroke of the work;

Fig. 4 is a view identical with Fig. 3 illustrating, however, the work support and work at the opposite end of the feeding stroke thereof with respect to the cutting wheel;

Fig. 7 is a side elevational view of the surface grinder embodying the invention.

Figure 5:
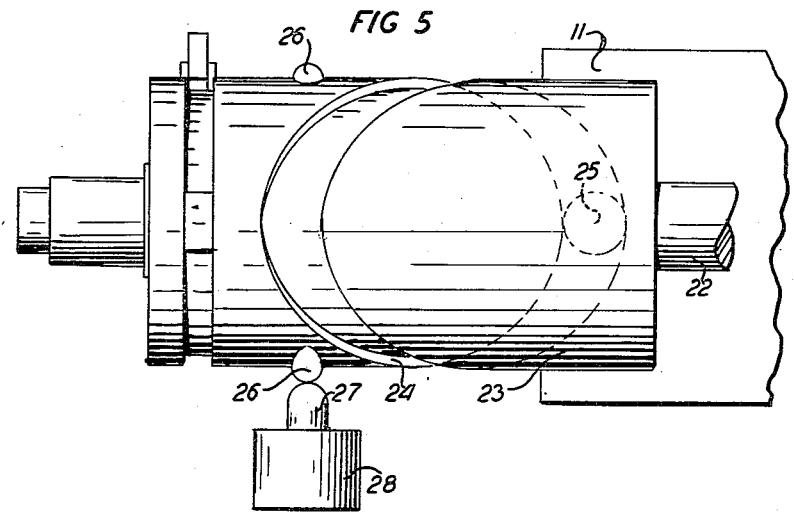
Fig. 5 is a fragmentary bottom plan view of the table or work support actuating mechanism and the projections thereon for operating the solenoid control switch.

Referring now to the drawings, attention is directed first to Fig. 1 which illustrates a surface grinder 10 having a conventional work supporting table 11 on which work 12 is mounted. The table 11 is driven by the conventional mechanism, shown in Fig. 5, under the control of a motor 14 (Fig. 6). A suitable cutter 15 or a series of cutters mounted on the conventional shaft 16 is driven by a motor 17. The motor 17, including the shaft 16, the cutter 15 and the associated mechanism of the cutting unit of the surface grinder are mounted for vertical movement on the conventional guides 18 and threadedly connected mechanically to the conventional spindle 19 of the cutter moving means terminating in a hand wheel 20. The partially threaded spindle 19 is held against longitudinal movement in the conventional manner and may be rotated by the hand wheel 20 and by a downfeed mechanism hereinafter described to bring about movement of the cutter and its motor drive.

Figure 6:
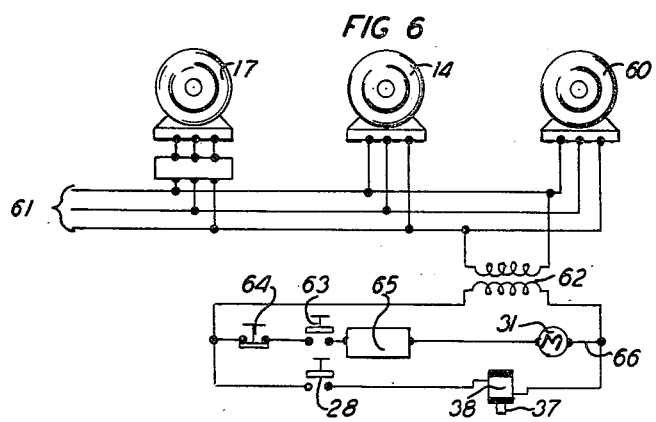
Fig. 6 is a schematic wiring diagram of the main control for the surface grinder and the additional features for the downfeed mechanism.

Attention is now directed to Fig. 5 which includes a portion of the table moving means including a shaft 22 which may be the output shaft of a speed reducing mechanism driven by motor 14. A drum cam 23 mounted on the shaft 22 has the conventional groove 24 to receive a cam follower 25 to cause reciprocation of the table 11 between given limits during each revolution of the cam and shaft. Projections 26 are mounted diametrically opposite each other in the cam 23 to actuate the plunger 27 of a normally open switch 28 to close the switch momentarily at the end of each half cycle of the surface grinder or at the end of each reciprocable movement of the table 11.

The present embodiment of the invention includes the downfeed mechanism constituting the modification of this surface grinder. The mechanism has a supporting frame 30 on which is mounted a motor 31 to be energized during the interval of time the surface grinder is in operation. A shaft 32 of the motor 31 has a pinion 33 mounted thereon driving a gear 34 of a conventional one revolution clutch 35 which is held disengaged by a trip finger 36 engaging a core or projection of a core 37 of a solenoid 38. It is believed that the clutch is well known in the art and that a complete disclosure of its mechanism is not essential. The finger 36, when released by the projection or core 37, will be spring operated or otherwise moved to immediately connect the clutch to operatively connect the motor shaft 32 with a shaft 40. The solenoid 38 will be energized momentarily to release the finger 36 and is deenergized prior to the complete cycle of the clutch so that the projection or core 37 will return to a position in a path of the finger to stop or disengage the clutch after the completion of one cycle or one turn of shaft 40.

A worm 41 is mounted on the shaft 40 to drive a worm gear 42 which is mounted on a shaft 43. A gear 44 mounted on the shaft 43 drives an idler gear 45 which is mounted on a spindle 46. The idler gear 45 drives a gear 47 mounted on a shaft 48 with a gear 49. A pinion 50 mounted on a shaft 51 rotatably supported in suitable bearings is under the control of a hand lever 54 pivoted at 55 and normally urged in a direction by a spring 56 to keep the gear 50 in engagement with the gear 49 and a gear 57. The sprindle 19, upon which the gear 57 is fixedly mounted as at 58, has a conventional screw thread connection with the cutting unit.

Attention is now directed to Fig. 6 wherein, in addition to the table feeding motor 14 and the cutter driving motor 17, another motor 60 is shown which is adapted to drive the conventional pump for pumping a suitable fluid over the cutter or work to facilitate the grinding or cutting operation. The circuits including the motors 14, 17 and 60 are connected to a suitable source of electrical energy through lines 61. The transformer 62, the starting switch 63, the stop switch 64 and other features of the control circuits for the surface grinder, represented by 65 in line 66, are parts of the initial control features for the surface grinder. In addition to these features, the motor 31 is included in line 66 to indicate that the motor 31 is energized during the interval of time the surface grinder is operating. There is an added circuit including the solenoid 38 with its core or projection 37 and the switch 28 so that each time switch 28 is closed by the projections 26 on the cam 23 (Fig. 5) the solenoid 38 will free the clutch 35 to operate.

Considering now the operation of the apparatus, let it be assumed that work 12 of a given thickness is mounted on the table 11. It is important to be able to utilize the rapid adjusting means of the cutter unit through the actuation of the hand wheel 20 to move the cutter 15 to its initial or starting position which may be represented in Fig. 3. To accomplish this, the lever 54 is actuated against the force of the spring 56 to move gear 50 out of the train of gears until the adjustment is made. At this time, the surface grinder may be set in operation by closing the start switch 63, assuming that the circuits to the motors 14, 17 and 60 have been closed previously. When the start switch 63 is closed and the other features of the control circuit represented by 65 having functioned, the motor 31 will be energized, driving the pinion 33, the gear 34 and the normally rotating portion of the clutch 35. The downfeed mechanism shown in Fig. 2 will not be operated until the completion of one half cycle of the grinder, at which time one of the projections 26 will actuate the switch 28, to complete the circuit through the solenoid 38. Energization of the solenoid 38 will release the finger 36 of the clutch and allow the clutch to close through one complete revolution to drive the shaft 40. When the shaft 40 is driven, the train of gears will cause rotation of the spindle 19 a predetermined distance to move the cutter 15 downwardly a known distance to prepare it for the next half cycle of the machine. This operation continues automatically, adjusting the cutter relative to the work at the end of each reciprocal stroke of the work until the desired cutting operations have been completed, at which time, a main switch (not shown) in the supply lines 61 may be operated in open position to deenergize the motors 17, 14 and 60. At this time manual adjustment of the cutting unit upwardly may be made. This is accomplished by moving the idler 50 free of engagement with the gears 49 and 57 through actuation of lever 54. After each adjustment of the cutting unit by the hand wheel 20, the lever 54 may be released and the idler will again assume its position in the train of gears. Attention is also directed to the gears 44 and 47 with the idler 45. These gears may be exchanged for gears of other sizes to thereby vary the amount of adjustment of the cutter relative to the work.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A downfeed mechanism, in combination with a threaded spindle having a hand wheel fixed thereto for manual actuation to rapidly feed a driven cutting wheel downwardly toward a path in which work on a support is given successive reciprocable movements between given limits during each half cycle of a rotatable element for driving the support, the mechanism comprising driving means energized while the cutting wheel is driven, a gear mounted on the threaded spindle, a train of gears including a one revolution clutch interposed between the gear on the spindle and the driving means and operatively connected thereto, and means rotatable with the driving element to cause actuation of the clutch during each half cycle of the driving element when the work support is adjacent each limit to operatively connect the driving means through the train of gears to the gear on the spindle to rotate the spindle to feed the cutting wheel predetermined like distances toward the path.

2. A downfeed mechanism, in combination with a threaded spindle having a hand wheel fixed thereto for manual actuation to rapidly feed a driven cutting wheel downwardly toward a path in which work on a support is given successive reciprocable movements between given limits during each half cycle of a rotatable element for driving the support, the mechanism comprising driving means energized while the cutting wheel is driven, a gear mounted on the threaded spindle, a train of gears including a one revolution clutch interposed between the gear on the spindle and the driving means and operatively connected thereto, a solenoid normally holding the clutch unoperated and energized when a switch is closed to free the clutch for connection of the train of gears with the gear on the spindle and the driving means to cause rotation of the spindle to feed the cutting wheel predetermined like distances toward the path, and means rotatable with the driving element to close the switch during each half cycle thereof when the work support is adjacent each limit.

3. A downfeed mechanism, in combination with a threaded spindle having a hand wheel fixed thereto for manual actuation to rapidly feed a driven cutting wheel downwardly toward a path in which work on a support is given successive reciprocable movements between given limits during each half cycle of a rotatable element for driving the support, the mechanism comprising driving means energized while the cutting wheel is driven, a gear mounted on the threaded spindle, a train of gears including a one revolution clutch interposed between the gear on the spindle and the driving means and operatively connected thereto, a solenoid normally holding the clutch unoperated and energized when a switch is closed to free the clutch for connection of the train of gears with the gear on the spindle and the driving means to cause rotation of the spindle to feed the cutting wheel predetermined like distances toward the path, means rotatable with the driving element to close the switch during each half cycle thereof when the work support is adjacent each limit, and means actuable to disconnect the train of gears from the gear on the spindle to free the spindle for manual actuation.

References Cited in the file of this patent
UNITED STATES PATENTS

| 915,128 | Trefethen | Mar. 16, 1909 |
|---|---|---|
| 1,228,798 | Maag | June 5, 1917 |
| 2,319,154 | Orlow | May 11, 1943 |
| 2,334,581 | Pyne | Nov. 16, 1943 |
| 2,396,775 | De Young | Mar. 19, 1946 |
| 2,535,183 | Wilson | Dec. 26, 1950 |